June 16, 1936.  J. J. TATUM  2,044,514
JOURNAL BOX BEARING
Filed July 5, 1935
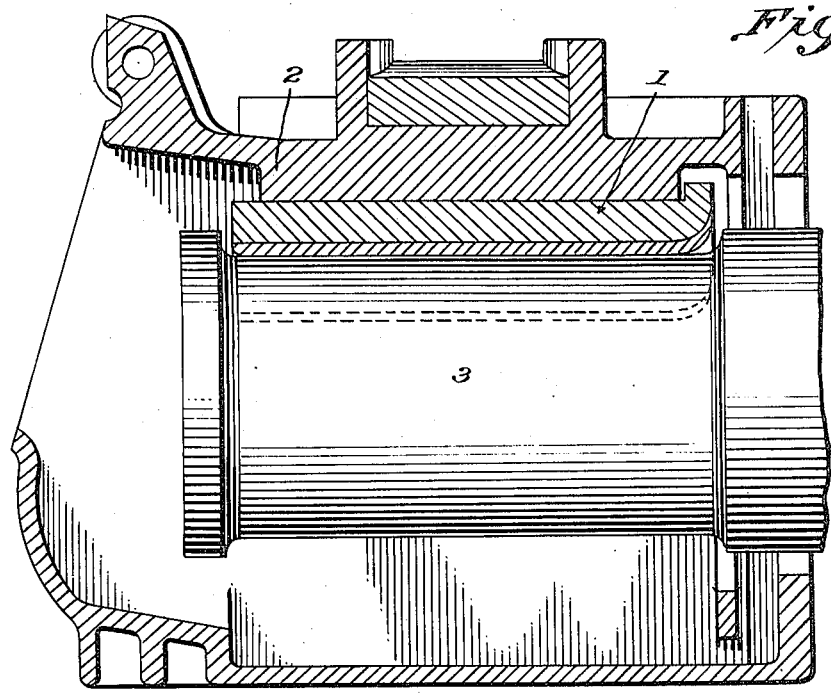
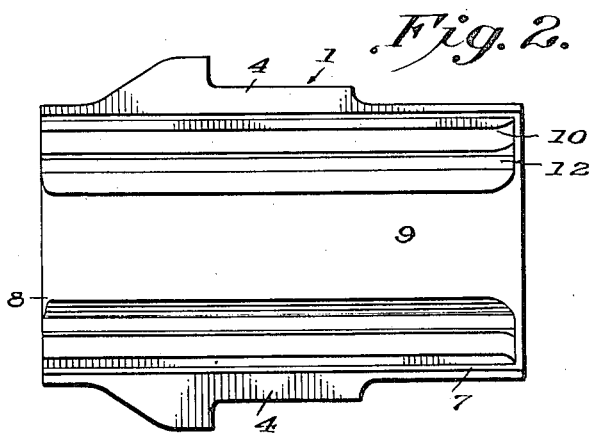
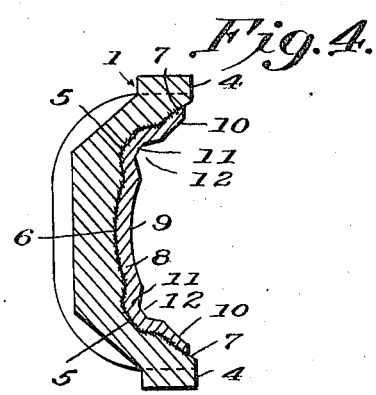
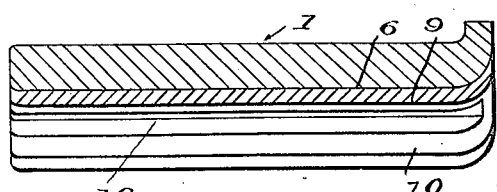
Inventor
John J. Tatum.

Patented June 16, 1936

2,044,514

UNITED STATES PATENT OFFICE 2,044,514

JOURNAL BOX BEARING

John J. Tatum, Baltimore, Md.

Application July 5, 1935, Serial No. 29,973

4 Claims. (Cl. 308—79.1)

This invention relates to improvements in journal bearings and particularly to improvements in bearing brasses for the bearing boxes of railway cars and the like.

An objection to bearing brasses of journal boxes as ordinarily constructed is that they allow small particles of the lubricating waste, with which the box is packed, which particles are known as waste grabs, to be cut at the side edges of the bearing brass and carried up by the rotating journal and confined and packed between the top of the journal and the bearing side of the bearing brass, often resulting in producing a hot box. Another objection to ordinary brasses is that these confined particles of waste grabs allowed to pass up between the journal and brass become compacted so that they not only engender friction with the result described but further promote the bringing about of such objectionable result by interfering with the free supply of oil to the top of the bearing.

One object of my invention is to provide a bearing brass of novel construction which is provided with means for trapping such particles or grabs of waste which unavoidably pass up between the journal and bearing brass and preventing such particles from becoming compacted in a layer between the upper surface of the journal and the bearing brass, whereby friction and hot boxes due to the causes above mentioned are avoided.

A further object of the invention is to provide a bearing brass construction whereby the trapped and retained particles of waste will be disposed in such manner as to hold oil and thereby facilitating and rendering certain, instead of decreasing, the supply of oil to the upper surface of the journal, whereby liability of undue friction and the production of hot boxes is reduced to a still further degree.

In the accompanying drawing illustrating my invention,—

Fig. 1 is a vertical longitudinal section through a journal box showing the application thereto of my improved bearing brass.

Fig. 2 is a bottom plan view of the bearing brass.

Fig. 3 is a longitudinal section of the bearing brass.

Fig. 4 is a transverse section thereof.

Referring now more particularly to the drawing, 1 represents my improved bearing brass which is arranged in the usual manner, and as shown in Fig. 1, in the upper portion of a journal box 2 and between the top of the journal box and the upper surface of the axle journal 3.

The brass 3 comprises a casting of such material having its outer or upper surface suitably shaped to fit within the top of the journal box and having its lower or inner surface concaved or extending on an arc of curvature between oppositely disposed plane side abutment surfaces 4 to conform to the curvature of the journal 3. This concaved or curved bearing surface is broken in my improved construction by providing the bearing face of the brass with longitudinally extending grooves 5 located on opposite sides of the longitudinal center of the bearing face and equidistantly between the same and the plane side abutment faces 4.

The provision of the grooves 5 divides the bearing surface of the bearing brass into a centrally curved or concaved surface 6 and side concaved or curved surfaces 7, the surface 6 being located between the grooves 5 and the surfaces 7 between said grooves and the plane faces 4.

The bearing face of the bearing brass body so formed is provided with a liner 8 of white metal, preferably babbitt metal, which is of a suitable degree of thickness for the purpose and covers the bearing face of the brass body substantially throughout the length thereof and from side to side thereof between the surfaces 7. This liner 8 is provided with a central portion 9 seated on and conforming to the curvature of the face 6 of the brass body, with side portions 10 extending at an angle with relation to the body portion 9 and lapping over upon the surfaces 7 of the brass body and conforming in curvature thereto, and with offset portions 11 between the portions 9 and 10, which offset portions are transversely of frusto-triangular or inverted V-shape in cross-section so as to form on the inner face of the liner retaining ribs fitting within the grooves 5 and on the outer or bearing face of the lining counterpart retaining grooves 12 of a shape conforming to and coextensive in length substantially with the grooves 5. These grooves 12 flare or increase in width toward the bearing face of the liner through which they open, thus providing grooves of a form which will freely receive the oil and particles of waste grabs and retain the same therein without packing, and which, while retaining the particles of waste, and thus prevent the same from spreading over the bearing face of the liner and compacting between the same and the journal, will at the same time allow free spread of the lubricant.

It will thus be seen that the liner 8 is provided with flaring grooves lying on opposite sides of the longitudinal center of the bearing, between the central and side curved or concaved faces thereof, these flaring grooves providing longitudinally extending pockets of some material depth and width in the bearing face of the bearing, while leaving ample bearing surface for contact of the liner with the journal. These grooves in the liner serve as traps to collect the small particles or grabs of waste which ordinarily catch in the side edges of the bearing brass and are drawn up by the rotating movement of the journal between the top of the journal and the underside of the bearing liner and to retain such particles of the waste therein. By this means the particles of waste are retained in the pockets and prevented from spreading and packing between the surfaces of the liner and journal and causing excessive friction whereby hot boxes are produced. The collection of these small particles of waste in the pockets leaves the bearing surfaces 9 and 10 of the white metal or babbitt metal in contact with the journal at all times, thus ensuring the maintenance of a substantially antifriction bearing surface of adequate area between the liner and journal. By this means the liability of the production of hot boxes as a result of friction due to the packing of waste between the bearing surfaces is avoided or reduced to a practically negligible degree. The grooves 12 also act as oil grooves, as they trap the oil flowing between the journal and liner and retain stores of oil therein, and as they extend from end to end of the liner they ensure a longitudinal flow of oil to the longitudinal surfaces of the liner and journal and to the transverse surfaces of the collar and shoulder of the journal, while the lateral surfaces 10 wedge the oil against the journal and thus keep it confined within the bearing area and from escape at the sides of the bearing thus increasing the lubrication of the bearing surfaces to a material degree. It will be understood, of course, that particles of the waste retained in the grooves become saturated with the oil and hold the oil against undue rapid escape from the grooves, thus ensuring a continued supply of oil applied in a uniform manner to the bearing surfaces, whereby liability of friction and the production of hot boxes is still further reduced. By providing the grooves 5 in the brass and the offsets 11 on the liner, which offsets are of truncate triangular form to interlock with the grooves 5 and produce the counterpart recesses 12 of similar form, the liner is not only reinforced and materially strengthened against breakage and its strength of connection with the brass increased, but provision is made for the catching and storage of waste grabs and oil so as to secure the desirable results hereinbefore set forth without the necessity of employing separate and independent anchoring and waste retaining members on the liner.

The grooves 5 in the bearing brass act as holders to hold the ribs formed by the offset portions 11 of the liner, whereby the liner is interlocked with the bearing brass in such a manner as to prevent its lateral displacement in the rotation of the journals. This interlocking connection may be sufficiently tight to mechanically hold the parts together at all times. I, however, prefer to add to the security of the connection by amalgamating the white metal or babbitt lining with the brass, so as to hold the lining from displacement before and after being applied to the journal or while in use or being handled or stored prior to use on the journal. This amalgamating action may be effected by first tinning the bearing surfaces of the bearing brass and pouring the white metal or babbitt metal into the brass and properly molding or shaping it in such action, the liner metal amalgamating with the tinned surface of the bearing so as to furnish a firm bond therebetween. The liner may, however, be otherwise secured in position as desired and in such manner as to allow it to be removed when worn and a new liner substituted in its place.

By means of my invention hot boxes due to packing of waste in the manner described between the bearing surfaces of the bearing brass and the journal are effectually prevented and better lubrication of the bearing surfaces secured.

What I claim is:

1. A bearing brass for journal boxes having a bearing face provided with longitudinally extending retaining grooves of substantially frusto-triangular cross-sectional form located in said face equidistantly between the center and sides of the bearing face extending from end to end of the bearing, and a liner of bearing metal covering the bearing face and having longitudinally extending offset portions of substantially frusto-triangular cross-sectional shape forming on its inner face retaining ribs engaging said retaining grooves in the bearing brass and on its outer face counterpart oil and waste trap grooves flaring in the direction of the journal and extending from end to end of the liner to supply oil to the longitudinal surfaces of the journal and liner and to the transverse surfaces of the collar and shoulder of the journal.

2. A bearing brass for journal boxes having a bearing face provided with longitudinally extending retaining grooves of substantially frusto-triangular cross-sectional form located in said face equidistantly between the center and sides of the bearing face extending from end to end of the brass, and a liner of bearing metal covering the bearing face and having longitudinally extending offset portions of substantially frusto-triangular cross-sectional shape forming on its inner face retaining ribs engaging said retaining grooves in the bearing brass and on its outer face counterpart oil and waste trap grooves flaring in the direction of the journal and extending from end to end of the liner to supply oil to the longitudinal surfaces of the collar and shoulder of the journal, the opposed surfaces of the brass and liner being united by surface amalgamation.

3. A bearing brass for journal boxes having a bearing face provided with longitudinal retaining grooves extending from end to end of the brass and located in said face equidistantly between the center and sides of the bearing face, and a liner of bearing metal covering the bearing face of the bearing brass and provided with longitudinally extending offsets corresponding in arrangement with said retaining grooves, said offsets providing retaining ribs of frusto-triangular form engaging said retaining grooves and also providing correspondingly shaped lubricant and waste retaining grooves in the bearing face of the liner flaring toward said bearing face extending from end to end of the liner for supplying oil to the longitudinal surfaces of the journal and liner and to the transverse surfaces of the collar and shoulder of the journal, the bearing face of the liner being provided between its side edges and the grooves with faces inclined at an angle to wedge the oil against the journal.

4. A liner for bearing brasses for journal boxes having a bearing face provided with a crown portion and marginal side portions concentric with the surface of the journal, said crown and marginal side portions being separated by longitudinal grooves located substantially equidistantly between the vertical center and side edges of the brass and extending from end to end of the bearing to supply oil to the longitudinal surfaces of the journal and bearing and to the transverse surfaces of the collar and shoulder of the journal, each of said grooves being of substantially frusto-triangular form progressively increasing in width toward the bearing face of the bearing, said bearing face of the liner being provided between its side edges and the grooves with faces inclined at an angle to wedge the oil against the journal, and said liner having correspondingly shaped ribs projecting from its rear face in alinement with and backing the grooves and serving as locking members to engage similarly shaped keeper grooves in the bearing brass.

JOHN J. TATUM.